United States Patent
Tong et al.

(10) Patent No.: US 8,508,198 B2
(45) Date of Patent: Aug. 13, 2013

(54) POWER SUPPLY CONVERSION CIRCUIT OF MULTI-PHASE POWER SUPPLY

(75) Inventors: Song-Lin Tong, Shenzhen (CN); Ling-Ling Shen, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 317 days.

(21) Appl. No.: 13/105,816

(22) Filed: May 11, 2011

(65) Prior Publication Data

US 2012/0188805 A1    Jul. 26, 2012

(30) Foreign Application Priority Data

Jan. 20, 2011  (CN) .......................... 2011 1 0022770

(51) Int. Cl.
*G05F 1/565* (2006.01)
(52) U.S. Cl.
USPC .......................................... 323/272; 323/285
(58) Field of Classification Search
USPC .......................................... 323/272, 282, 285
See application file for complete search history.

(56) References Cited

U.S. PATENT DOCUMENTS

| | | | | |
|---|---|---|---|---|
| 6,249,447 | B1 * | 6/2001 | Boylan et al. | 363/97 |
| 7,394,264 | B2 * | 7/2008 | Blanc et al. | 324/721 |
| 7,777,460 | B2 * | 8/2010 | Schuellein | 323/272 |
| 8,044,645 | B2 * | 10/2011 | Zambetti et al. | 323/272 |
| 8,072,200 | B1 * | 12/2011 | Qiu et al. | 323/282 |

* cited by examiner

*Primary Examiner* — Harry Behm
(74) *Attorney, Agent, or Firm* — Altis Law Group, Inc.

(57) ABSTRACT

A power supply conversion circuit includes a PWM chip and many sub-circuits. Each sub-circuit includes an inductor, a first capacitor connected to ground, a first resistor connected in series with the first capacitor to form a branch parallel to the inductor, a differential pair having a first differential signal trace and a second differential signal trace, a second resistor, and a second capacitor. The first trace is connected between the connection of the first resistor and the first capacitor and the PWM chip. The second resistor is connected between the connection of the first resistor and the inductor and the second capacitor. The second trace is connected between the connection of the second resistor and the second capacitor and the PWM chip. The ratios of the capacitances of each two second capacitors are the same as that of the lengths of the traces of each two corresponding differential pairs.

10 Claims, 1 Drawing Sheet

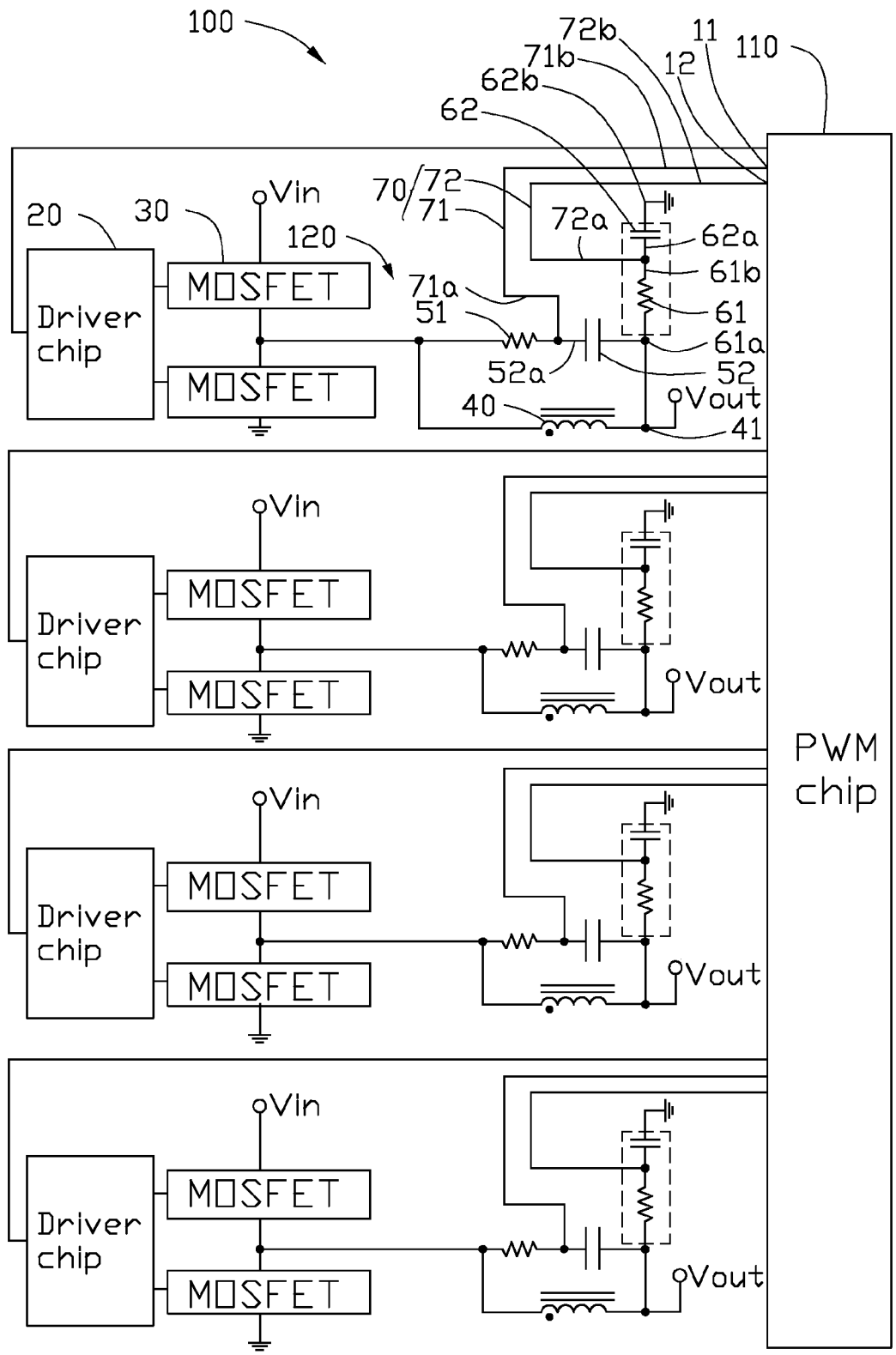

POWER SUPPLY CONVERSION CIRCUIT OF MULTI-PHASE POWER SUPPLY

BACKGROUND

1. Technical Field

The present disclosure relates to a power supply conversion circuit used in a multi-phase power supply.

2. Description of Related Art

Power for a computer system is usually supplied by a multi-phase power supply. The multi-phase power supply can be realized by using a plurality of power converting units instead of a single power converting unit, which is inefficient in a heavy load state. A pulse width modulation (PWM) chip controls the plurality of power converting units to convert direct current into alternating current. Each power converting unit includes an inductor. The PWM chip obtains a voltage of an RC circuit connected in parallel with each inductor. However, because the positions of the different RC circuits are different, thus, a lot of differential pairs connected between a terminal of the PWM chip and a voltage output terminal of an RC circuit have different lengths. The longer differential pairs are more affected by noise. Therefore, the PWM chip is incapable of obtaining exact sampling voltage of each power converting unit.

What is needed, therefore, is a power supply conversion circuit of a multi-phase power supply capable of overcoming the described limitations.

BRIEF DESCRIPTION OF THE DRAWING

Many aspects of the embodiments can be better understood with reference to the following drawing. The components in the drawing are not necessarily drawn to scale, the emphasis instead being placed upon clearly illustrating the principles of the embodiments.

The drawing is a circuit diagram of a power supply conversion circuit of a multi-phase power supply according to an embodiment.

DETAILED DESCRIPTION

Embodiments of the present disclosure are described in detail as follows, with reference to the accompanying drawing.

Referring to the drawing, a power supply conversion circuit of a multi-phase power supply 100 according to an exemplary embodiment is shown. The power supply conversion circuit 100 includes a pulse width modulation (PWM) chip 110 and a number of sub-circuits 120. In the present embodiment, the power supply conversion circuit 100 includes four sub-circuits 120. Each sub-circuit 120 includes a driver chip 20, a pair of MOSFETs (Metal-Oxide-Semiconductor Field-Effect Transistors) 30, an inductor 40, a first resistor 51, a first capacitor 52, a second resistor 61, a second capacitor 62, and a differential pair 70.

The PWM chip 100 is electrically connected to each driver chip 20 for respectively sending four phase control signals of the four driver chips 20. Each driver chip 20 is electrically connected to one MOSFET 30 pair for controlling conduction of the MOSFETs 30. Each MOSFET 30 pair is electrically connected to the corresponding inductor 40. The inductors 40 reduce an input voltage Vin to a voltage Vout for matching with the CPU.

In each sub-circuit 120, the first resistor 51 is connected in series with the first capacitor 52 to form a branch parallel with the inductor 40. The voltage of the first capacitor 52 is proportional to the current of the inductor 40. The voltage of the first capacitor 52 and the current of the inductor 40 satisfy the following formula: $V = k \times I \times DCR$, wherein V represents the voltage of the first capacitor 52, k represents factor, I represents the current of the sub-circuit 120, and DCR represents the DC resistance of the capacitor 52. The PWM chip 110 calculates the current I of the sub-circuit 120 by: $I = V/(k \times DCR)$.

An end 61a of the second resistor 61 is electrically connected to the connection between the first capacitor 52 and the inductor 40. In this embodiment, the end 61a of the second resistor 61 is electrically connected to an end 41 of the inductor 40. The other end 61b of the second resistor 61 is electrically connected to an end 62a of the second capacitor 62. The other end 62b of the second capacitor 62 is connected to the ground.

The differential pair 70 includes a first differential signal trace 71 and a second differential signal trace 72. An end 71a of the first differential signal trace 71 is electrically connected to the connection between the first resistor 51 and the first capacitor 52. The other end 71b is electrically connected to a current detecting terminal 11 of the PWM chip 110 for detecting the current of the inductor 40. In the present embodiment, the end 71a of the first differential signal trace 71 is electrically connected to an end 52a of the first capacitor 52. An end 72a of the second differential signal trace 72 is electrically connected to the connection between the second resistor 61 and the second capacitor 62. The other end 72b of the second differential signal trace 72 is electrically connected to another current detecting terminal 12 of the PWM chip 110 for detecting the current of the inductor 40. In the present embodiment, the end 72a of the second differential signal trace 72 is electrically connected to the end 62a of the second capacitor 62.

The capacitance ratio between the different second capacitors 62 in different sub-circuits 120 is equal to a length ratio between the traces in the differential pair 70 in the corresponding sub-circuits 120, that satisfy the following formulas: $C1 = C4 \times L1/L4$; $C2 = C4 \times L2/L4$; $C3 = C4 \times L3/L4$, wherein C1, C2, C3 and C4 represent the capacitances of the four second capacitors 62, L1, L2, L3, and L4 represent the lengths of four differential pairs 70. The second resistor 61 and the second capacitor 62 in each sub-circuit 120 form an RC circuit. The delay time of the RC circuit satisfies the following formula: $t = R \times C \times \tau$, wherein t represents delay time, R represents resistance of the resistor in the RC circuit, C represents capacitance of the capacitor in the RC circuit, and $\tau$ represents a time constant. The capacitance of the second capacitors 62 are determined by the length ratio between the traces in the differential pairs 70 for extending the sampling time of the voltage of the sub-circuits 120. Though the longer length of the differential pair 70 has more noise, the longer length of the differential pair 70 has longer sampling time in the present embodiment. More samples can be obtained with longer sampling time. Thus, the PWM chip 110 is capable of calculating a more precise result by obtaining more samples. Specifically, delay time is less than 30 nanoseconds, the resistance of the second resisters 61 is less than 300 ohms, and the capacitance of the second capacitors 62 is less than 270 picofarads. In this embodiment, the resistance of the second resisters 61 is 200 ohms, the capacitance C1 is 69 picofarads, the capacitance C2 is 94 picofarads, the capacitance C3 is 106 picofarads, and the capacitance C4 is 150 picofarads.

While certain embodiments have been described and exemplified above, various other embodiments will be apparent to those skilled in the art from the foregoing disclosure. The present disclosure is not limited to the particular embodiments described and exemplified, and the embodiments are capable of considerable variation and modification without departure from the scope of the appended claims.

What is claimed is:

1. A power supply conversion circuit of a multi-phase power supply, comprising:
   a pulse width modulation chip;
   a plurality of sub-circuits, and each of the sub-circuits comprising:
   an inductor;
   a first capacitor;
   a first resistor connected in series with the first capacitor to form a branch parallel to the inductor in each sub-circuit;
   a second capacitor connected to the ground;
   a second resistor having two ends, one end connected to the connection between the first resistor and the inductor, the other end connected to the second capacitor in series;
   a differential pair comprising:
      a first differential signal trace having one end connected to the connection between the first resistor and the first capacitor, and another end connected to a current detecting terminal of the pulse width modulation chip;
      a second differential signal trace having two ends, one end connected to the connection between the second resistor and the second capacitor, the other end connected to another current detecting terminal of the pulse width modulation chip;
   wherein the ratios of the capacitances of each two second capacitors are same to that of the lengths of traces in each two corresponding differential pairs.

2. The power supply conversion circuit of multi-phase power supply as claimed in claim 1, wherein each sub-circuit comprises a driver chip and a couple of MOSFETs, every driver chip are electrically connected to the pulse width modulation chip for receiving multi-phase controlling signals from the pulse width modulation chip, each driver chip is electrically connected to the couple of MOSFET respectively for driving the MOSFET, each couple of MOSFET is electrically connected to each inductor.

3. The power supply conversion circuit of multi-phase power supply as claimed in claim 1, wherein the power supply conversion circuit satisfy the following formulas: $C1=C4 \times L1/L4$; $C2=C4 \times L2/L4$; $C3=C4 \times L3/L4$, wherein C1, C2, C3 and C4 represent the capacitances of the four second capacitors, L1, L2, L3, and L4 represent the lengths of four differential pairs.

4. The power supply conversion circuit of multi-phase power supply as claimed in claim 1, wherein the current of the inductor satisfy the following formula: $V=k \times I \times DCR$, wherein V represents the voltage of the first capacitor, k represents factor, I represents the current of the sub-circuit, DCR represents the DC resistance of the capacitor.

5. The power supply conversion circuit of multi-phase power supply as claimed in claim 1, wherein the delay time of the second resister and the second capacitor is less than 30 nanoseconds.

6. The power supply conversion circuit of multi-phase power supply as claimed in claim 5, wherein the resistance of the second resister is less than 300 ohms.

7. The power supply conversion circuit of multi-phase power supply as claimed in claim 6, wherein the resistance of the second resister is 200 ohm.

8. The power supply conversion circuit of multi-phase power supply as claimed in claim 5, wherein the capacitance of the second capacitor is less than 270 picofarads.

9. The power supply conversion circuit of multi-phase power supply as claimed in claim 8, wherein the capacitance of the second capacitor is equal to 150 picofarads.

10. The power supply conversion circuit of multi-phase power supply as claimed in claim 5, wherein the delay time of the second resister and the second capacitor satisfy the following formula: $t=R \times C \times \tau$, wherein t represents delay time, R represents resistance of the second resister, C represents capacitance of the second capacitor, $\tau$ represents time constant.

* * * * *